US012779608B2

(12) United States Patent
Suekane et al.

(10) Patent No.: US 12,779,608 B2
(45) Date of Patent: Nov. 3, 2026

(54) MACHINING METHOD AND MACHINING APPARATUS

(71) Applicant: SUGINO MACHINE LIMITED, Namerikawa City (JP)

(72) Inventors: Yuta Suekane, Namerikawa City (JP); Ryuto Hongo, Namerikawa City (JP)

(73) Assignee: SUGINO MACHINE LIMITED, Namerikawa City (JP)

( * ) Notice: Subject to any disclaimer, the term of this patent is extended or adjusted under 35 U.S.C. 154(b) by 283 days.

(21) Appl. No.: 18/661,601

(22) Filed: May 11, 2024

(65) Prior Publication Data

US 2024/0391043 A1 Nov. 28, 2024

(30) Foreign Application Priority Data

May 25, 2023 (JP) ................................. 2023-085995

(51) Int. Cl.
*B23Q 15/013* (2006.01)
*B23Q 17/09* (2006.01)

(52) U.S. Cl.
CPC ....... *B23Q 15/013* (2013.01); *B23Q 17/0966* (2013.01); *B23Q 2717/006* (2013.01)

(58) Field of Classification Search
CPC .............. B23Q 15/013; B23Q 17/0966; B23Q 2717/006
USPC ....................................................... 73/862.06
See application file for complete search history.

(56) References Cited

U.S. PATENT DOCUMENTS 4,723,219 A * 2/1988 Beyer ................ G05B 19/4067 700/190
2018/0272491 A1* 9/2018 Yang .................. B23Q 17/0971
2020/0333764 A1* 10/2020 Takahei ............... G05B 19/404
2021/0159823 A1* 5/2021 Senoo ...................... H02P 3/025
2023/0037756 A1* 2/2023 Aiba .................. G05B 19/4065
(Continued)

FOREIGN PATENT DOCUMENTS

| | | | |
|---|---|---|---|
| JP | S60-080545 A | 5/1985 |
| JP | S61-016581 B2 | 5/1986 |
| JP | S63-212447 A | 9/1988 |

(Continued)

OTHER PUBLICATIONS

Extended European Search Report mailed on Oct. 25, 2024 in a corresponding European Patent Application No. 24174182.6 (12 pages).

(Continued)

*Primary Examiner* — Peter J Macchiarolo
*Assistant Examiner* — Rodney T Frank
(74) *Attorney, Agent, or Firm* — United IP Counselors, LLC

(57) ABSTRACT

When machining small diameter holes, tool breakage and torque fluctuation at the machining point are detected. The machining method includes: measuring a reference thrust of a spindle when the spindle is fed from a machining feed start point to a machining end point in a direction in which the spindle extends under a machining condition without machining a workpiece; determining a threshold with respect to a feed coordinate based on the reference thrust; measuring a machining thrust of the spindle with respect to the feed coordinate while machining the workpiece; and comparing the machining thrust with the threshold with respect to the feed coordinate.

18 Claims, 7 Drawing Sheets

(56) References Cited

U.S. PATENT DOCUMENTS

| | | | | |
|---|---|---|---|---|
| 2023/0165594 A1* | 6/2023 | Harris | .................. | G05B 19/182 606/180 |

FOREIGN PATENT DOCUMENTS

| | | | |
|---|---|---|---|
| JP | H05-329750 | A | 12/1993 |
| JP | H11-320201 | A | 11/1999 |
| JP | 2000-263378 | A | 9/2000 |
| JP | 2021-064128 | A | 4/2021 |
| KR | 10-2019-0013344 | A | 2/2019 |

OTHER PUBLICATIONS

Lombardo A et al: "The International Journal of Advanced Manufacturing Technology; In-Process Tool-Failure Detection by Means of AR Models", Feb. 28, 1997, pp. 86-94, XP093215672, Retrieved from the Internet: URL: https://link.springer.com/content/pdf/10.1007/BF01225754.pdf.

Xiaoli Li: "Detection of Tool Flute Breakage in End Milling Using Feed-Motor Current Signatures", IEEE/ASME Transactions On Mechatronics, IEEE Service Center, Piscataway, NJ, US, vol. 6, No. 4, Dec. 1, 2001, XP011034362, ISSN: 1083-4435.

* cited by examiner

MACHINING METHOD AND MACHINING APPARATUS

CROSS-REFERENCE TO RELATED APPLICATIONS

This application claims the benefit of priority to Japanese Patent Application No. 2023-085995, filed on May 25, 2023, the entire contents of which are hereby incorporated by reference.

BACKGROUND

1. Technical Field

The present invention relates to a machining method and a machining apparatus.

2. Description of the Background

A tool breakage detection method in a NC drilling device that feeds a drilling tool by a servo motor controlled by a servo amplifier is known (for example, JP-A-H05-329750). In the tool breakage detection method, breakage of the tool is detected when the duration of the state, in which the input torque signal voltage exceeds the threshold voltage, exceeds a predetermined time.

BRIEF SUMMARY

When a small diameter hole is machined, the machining resistance and the load on the feed shaft generated at the time of tool breakage are small. In addition, the thrust of the feed axis may vary depending on the feed coordinates.

An object of the present invention is to detect a tool breakage or a thrust variation at a machining point when machining a small diameter hole.

A first aspect of the present invention provides a machining method, including:

- measuring a reference thrust of a spindle when the spindle is fed from a machining feed start point to a machining end point in a direction in which the spindle extends under a machining condition without machining a workpiece;
- determining a threshold with respect to a feed coordinate based on the reference thrust;
- measuring a machining thrust of the spindle with respect to the feed coordinate while machining the workpiece; and
- comparing the machining thrust with the threshold with respect to the feed coordinate.

A second aspect of the present invention provides a machining apparatus, including:

- a feed device configured to feed a spindle;
- a thrust measurement device configured to measure a thrust of the spindle;
- a storage device configured to store
  - a reference thrust of the spindle measured when the spindle is fed from a machining feed start point to a machining end point in a direction in which the spindle extends under a machining condition without machining a workpiece, and
  - a threshold with respect to a feed coordinate;
- a threshold determination unit configured to determine the threshold based on the reference thrust; and
- a determination unit configured to compare a machining thrust of the spindle with respect to the feed coordinate with the threshold, the machining thrust being measured while machining the workpiece.

The threshold includes a breakage threshold and a return threshold.

The machining condition is defined by, for example, a machining feed start point, a machining end point, a feed speed, a spindle rotation speed, and a tool number.

If the feed device includes a rotating shaft or a motor, the reference thrust may be replaced by a reference torque. In this case, the machining thrust may be replaced by a machining torque.

The filter is, for example, a low-pass filter.

The delay time is a time from when the original signal waveform rises to when the filtered signal waveform rises. Here, the original signal waveform includes a reference thrust and a machining thrust.

The comparison between the machining thrust and the threshold may be started when a delay time elapses from when the tool comes into contact with the workpiece.

The machining start point is the position of the tool or spindle when the tool comes into contact with the workpiece as the tool approaches the workpiece. A machining start time is a time when the tool comes into contact with the workpiece as the tool approaches the workpiece.

The delay time is determined by a time constant determined by the filter. The increment of the feed coordinate corresponding to the delay time is defined as a delay coordinate. The delay coordinate is determined by the delay time, the feed speed, and the acceleration. The comparison between the machining thrust and the threshold may be started from the coordinates obtained by adding the delay coordinates from the feed coordinates of the machining start point, which is the position at which the tool comes into contact with the workpiece.

The breakage threshold and the return threshold may be determined based on the environmental temperature, the temperature of the machining apparatus, the cumulative operation time, and the material of the workpiece. Further, the breakage offset amount and the return offset amount may be determined based on the environmental temperature, the temperature of the machining apparatus, the cumulative operation time, and the material of the workpiece. The breakage threshold, the return threshold, the breakage offset amount, and the return offset amount may be determined based on a function using the environmental temperature, the temperature of the machining apparatus, the cumulative operation time, and the material of the workpiece as arguments.

Examples of the machining method include drilling, tapping, milling, and end milling. The machining method can be particularly suitably applied to drilling or tapping.

The machining apparatus is, for example, a machining center or a drilling machine. The drilling machine is, for example, a tapping machine.

The spindle is rotatably supported by the spindle head or the ram. The spindle is fed by a feed device via the spindle head or the ram. The feed device is, for example, a ball screw-motor mechanism, a cylinder, or a linear motor. The motor or the linear motor may be a servo motor. The cylinder is, for example, an air cylinder or an electric cylinder.

The thrust measuring device is, for example, a torque sensor, a motor amplifier, or a strain gauge. The motor amplifier is, for example, a servo amplifier. The thrust measuring device may be a torque measuring device. For example, the strain gauge may be mounted on the ram or the feed table.

The present invention enables to detect a tool breakage or a thrust variation at a machining point when machining a small diameter hole.

DETAILED DESCRIPTION

Hereinafter, a drilling machine according to an embodiment will be described.

Figure 1:
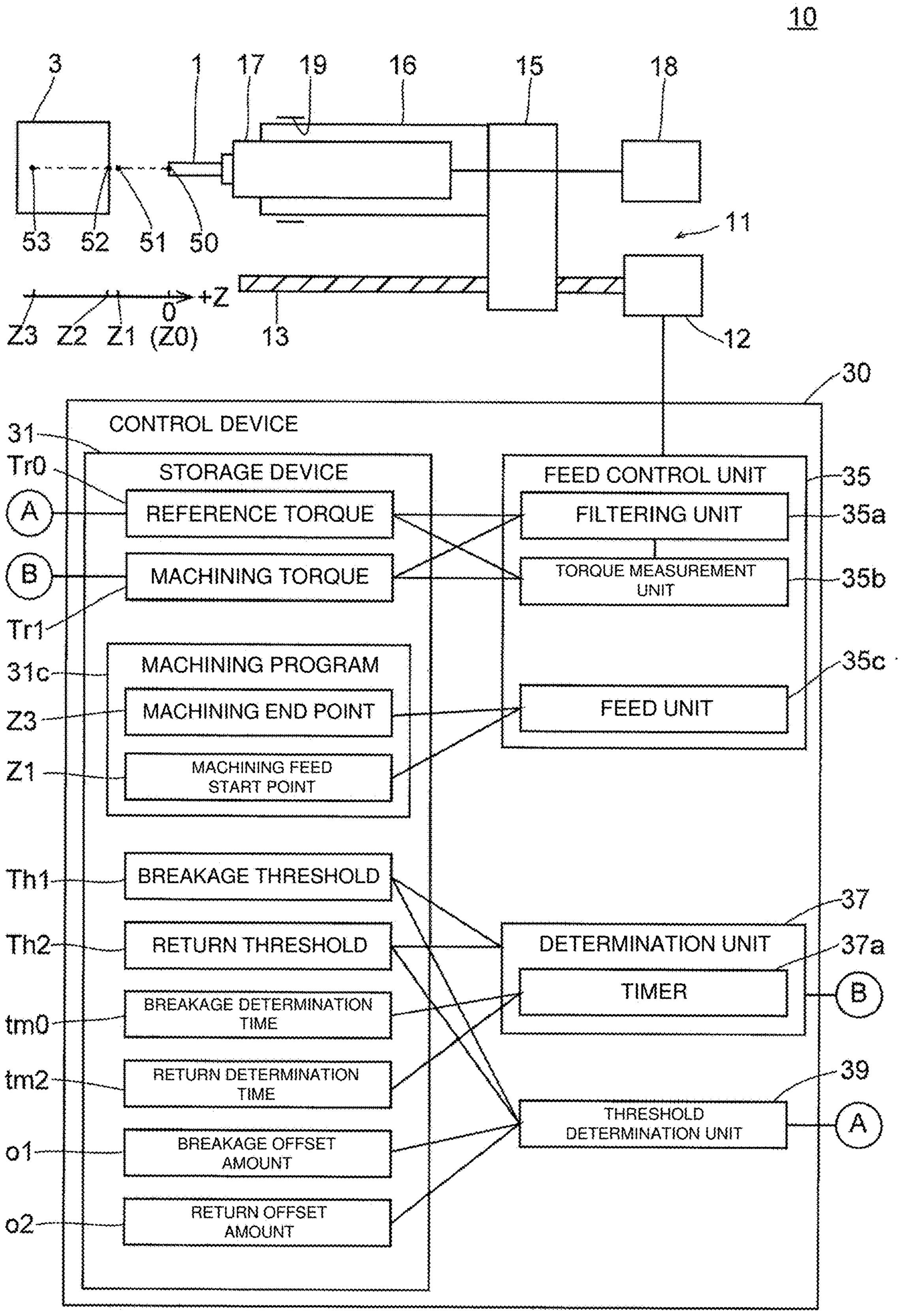
FIG. 1 is a schematic diagram of a machining apparatus according to a present embodiment.

As shown in FIG. 1, a drilling machine 10 according to a present embodiment includes a feed device 11, a ram 16, a spindle 17, a spindle motor 18, a ram guide 19, and a control device 30. A direction in which the spindle 17 extends (spindle direction) is defined as a Z direction. A positive Z direction is defined as a direction in which the spindle 17 is separated from a workpiece 3.

The feed device 11 includes a feed motor 12, a feed screw (feed shaft) 13, and a feed table 15.

The feed motor 12 is connected to the feed screw 13. The feed motor 12 reciprocates the feed table 15 in the Z direction via the feed screw 13. The feed motor 12 is, for example, a servo motor.

The ram 16 is connected to the feed table 15. The ram 16 rotatably supports the spindle 17. The ram 16 is guided by the ram guide 19. A tool 1 is attached to the spindle 17. The spindle 17 is connected to the spindle motor 18.

The control device 30 includes a storage device 31, a feed control unit 35, a determination unit 37, and a threshold determination unit 39. The control device 30 includes, for example, a servo amplifier and a programmable controller. The programmable controller is a numerical controller. The programmable controller includes a sequence control device.

The storage device 31 stores a reference torque (reference thrust) Tr0, a machining torque (machining thrust) Tr1, a machining program 31*c*, a breakage threshold Th1, a return threshold Th2, a breakage determination time tm0, a return determination time tm2, a breakage offset amount o1, and a return offset amount o2. The storage device 31 may store an origin Z0, a machining start point Z2, and a machining start time t2.

As shown in FIG. 1, the machining program 31*c* includes a machining feed start point Z1 and a machining end point Z3. The machining program 31*c* may include a feed speed (not shown), a spindle rotational speed (not shown), and a tool number (not shown). The machining conditions are defined by, for example, the machining feed start point Z1, the machining end point Z3, the feed speed (not shown), the spindle rotational speed (not shown), and the tool number (not shown).

The machining program 31*c* includes, for example, the following four steps. In a first step, the spindle motor 18 rotates the spindle 17 at the spindle rotational speed. In a second step, the feed motor 12 rapidly feeds the spindle 17 until a distal end of the tool 1 reaches the machining feed start point 51 (Z=Z1) from the origin 50 (Z=Z0). In a third step, the feed motor 12 feeds the spindle 17 at a feed rate until the distal end of the tool 1 reaches the machining end point 53 (Z=Z3). In a fourth step, the feed motor 12 rapidly feeds the spindle 17 to the origin 50.

The reference torque Tr0 is a torque (thrust) Tr of the feed motor 12 with respect to the coordinate (feed coordinate) Z when the tool 1 does not machine a workpiece 3. Here, the torque Tr is, for example, an actual measured value (unit: Nm) or a ratio to a rated torque (unit: %).

Figure 2:
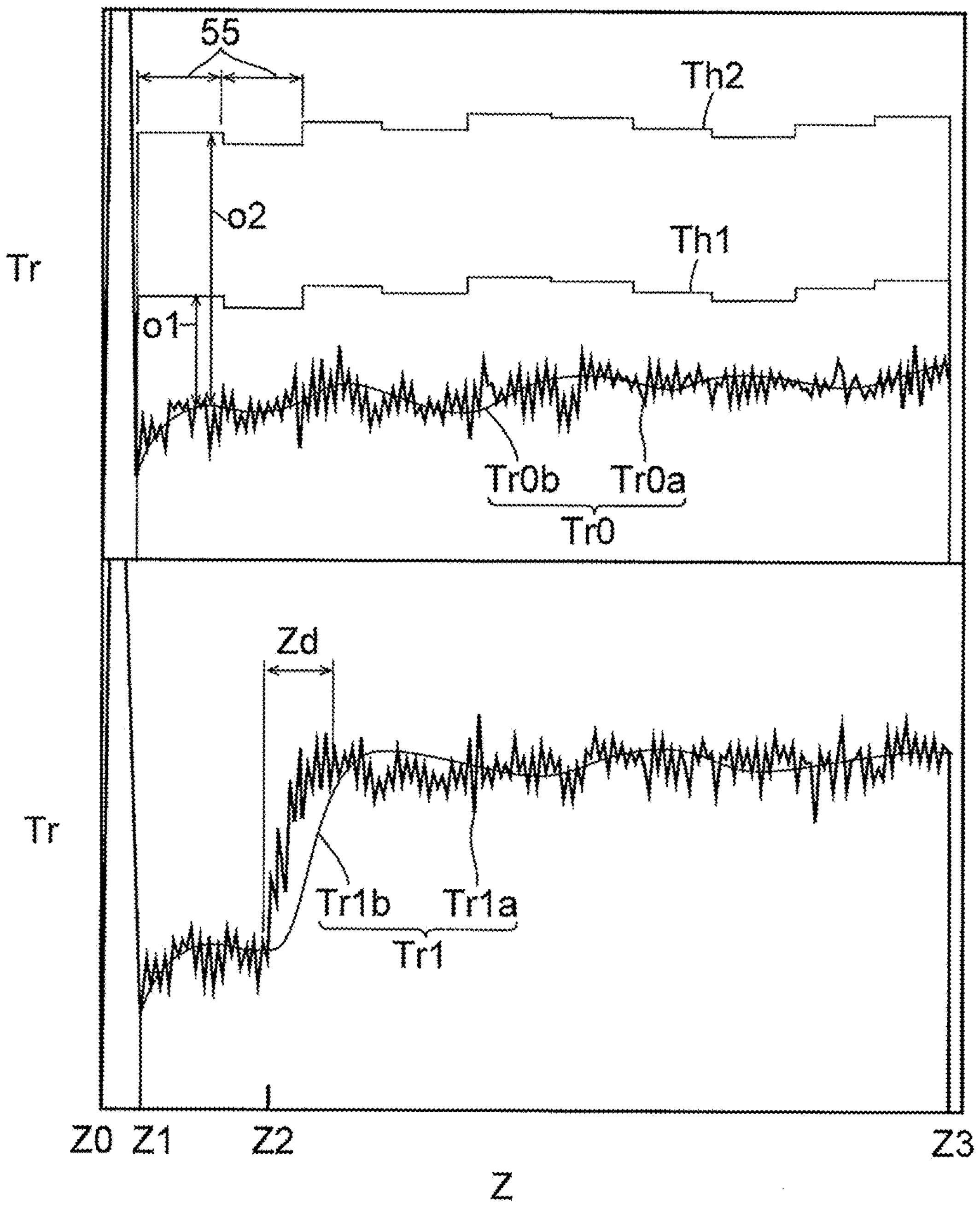
FIG. 2 shows a reference torque and a threshold with respect to a feed coordinate according to the present embodiment.

As shown in an upper half of FIG. 2, the reference torque Tr0 may include an actual reference torque Tr0*a* and a processed reference torque Tr0*b*. The actual reference torque Tr0*a* is the actual torque with respect to the coordinate Z. The processed reference torque Tr0*b* is obtained by filtering the actual reference torque Tr0*a*.

Figure 4:
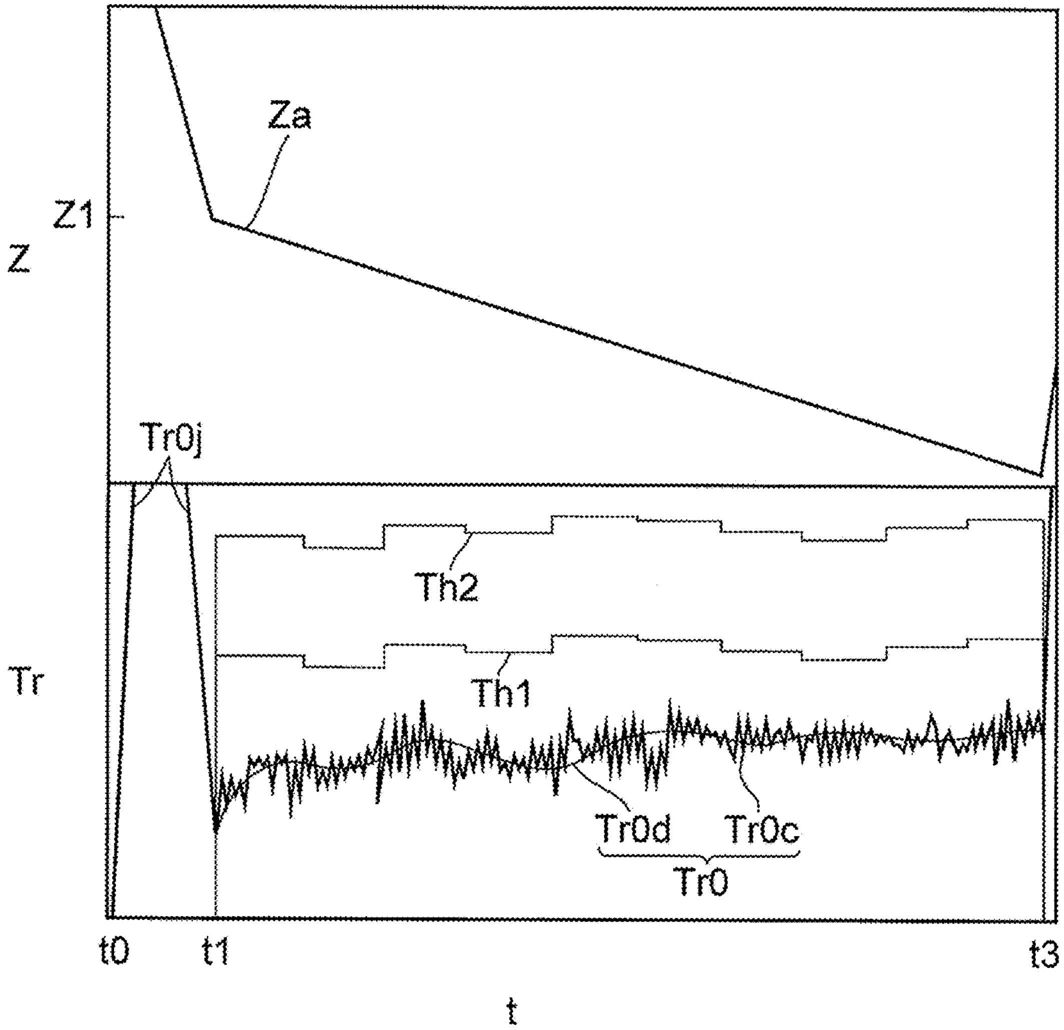
FIG. 4 shows a feed coordinate, a reference torque, and a threshold with respect to a machining time according to the present embodiment.

As shown in FIG. 4, the reference torque Tr0 may include an actual reference torque Tr0*c*, a processed reference torque Tr0*d*, and a coordinate Za. The actual reference torque Tr0*c* is an actual torque Tr with respect to a time (machining time) t. The processed reference torque Tr0*d* is obtained by filtering the actual reference torque Tr0*c*. The reference torque Tr0 may include a rapid feed torque Tr0*j*. The rapid feed torque Tr0*j* is a torque Tr when the feed table 15 is rapidly fed. The coordinate Za is a coordinate Z with respect to time t.

Note that the storage device 31 may temporarily store the reference torque Tr0 in order to calculate the breakage threshold Th1 or the return threshold Th2.

The machining torque Tr1 is the torque Tr of the feed motor 12 with respect to the coordinate Z when the tool 1 has machined the workpiece 3.

As shown in a lower half of FIG. 2, the machining torque Tr1 may include an actual machining torque Tr1*a* and a processed machining torque Tr1*b*. The actual machining torque Tr1*a* is an actual torque with respect to the coordinate Z. The processed machining torque Tr1*b* is obtained by filtering the actual machining torque Tr1*a*.

Figure 5:
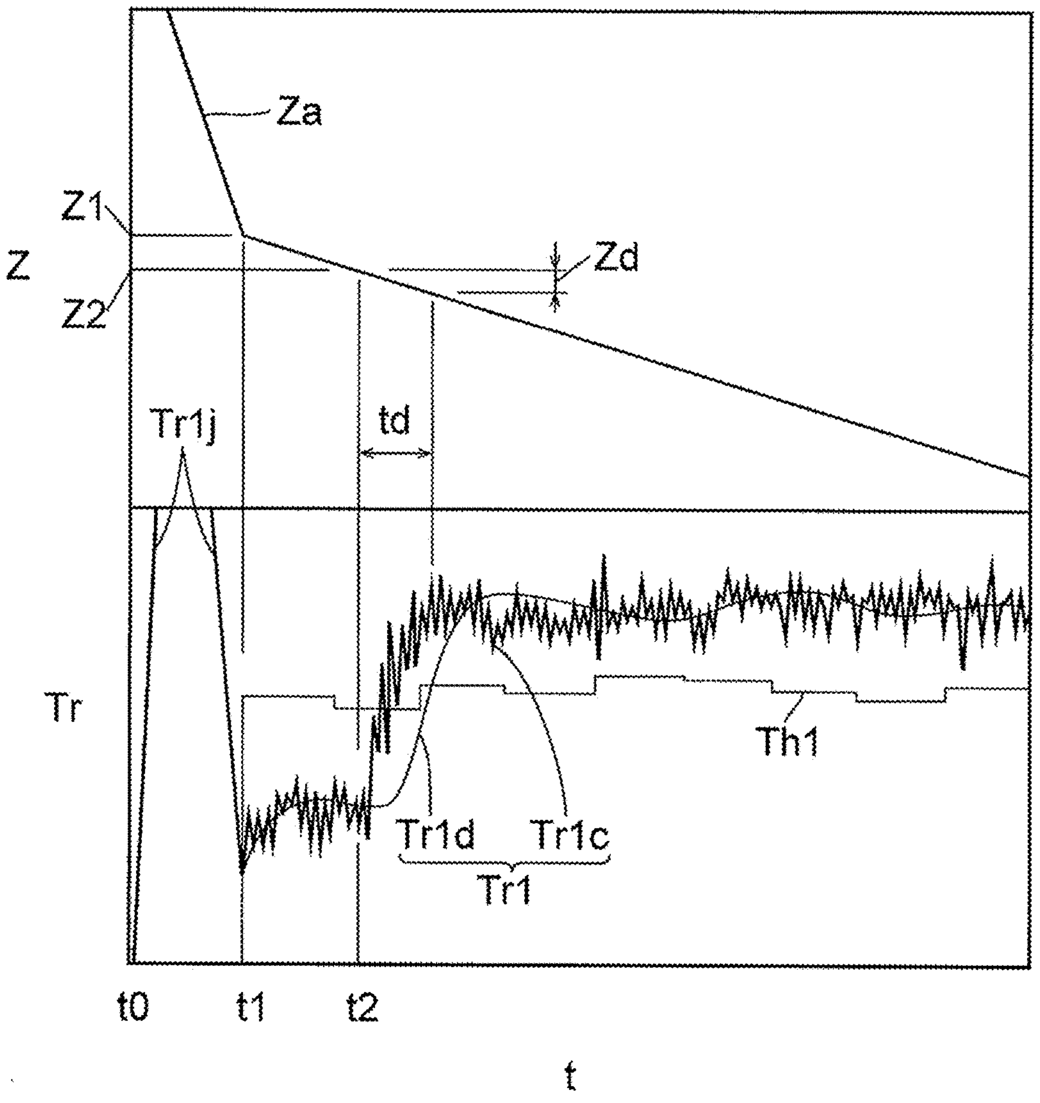
FIG. 5 shows a feed coordinate, a machining torque, and a threshold with respect to a machining time in proper machining according to the present embodiment.
Figure 6:
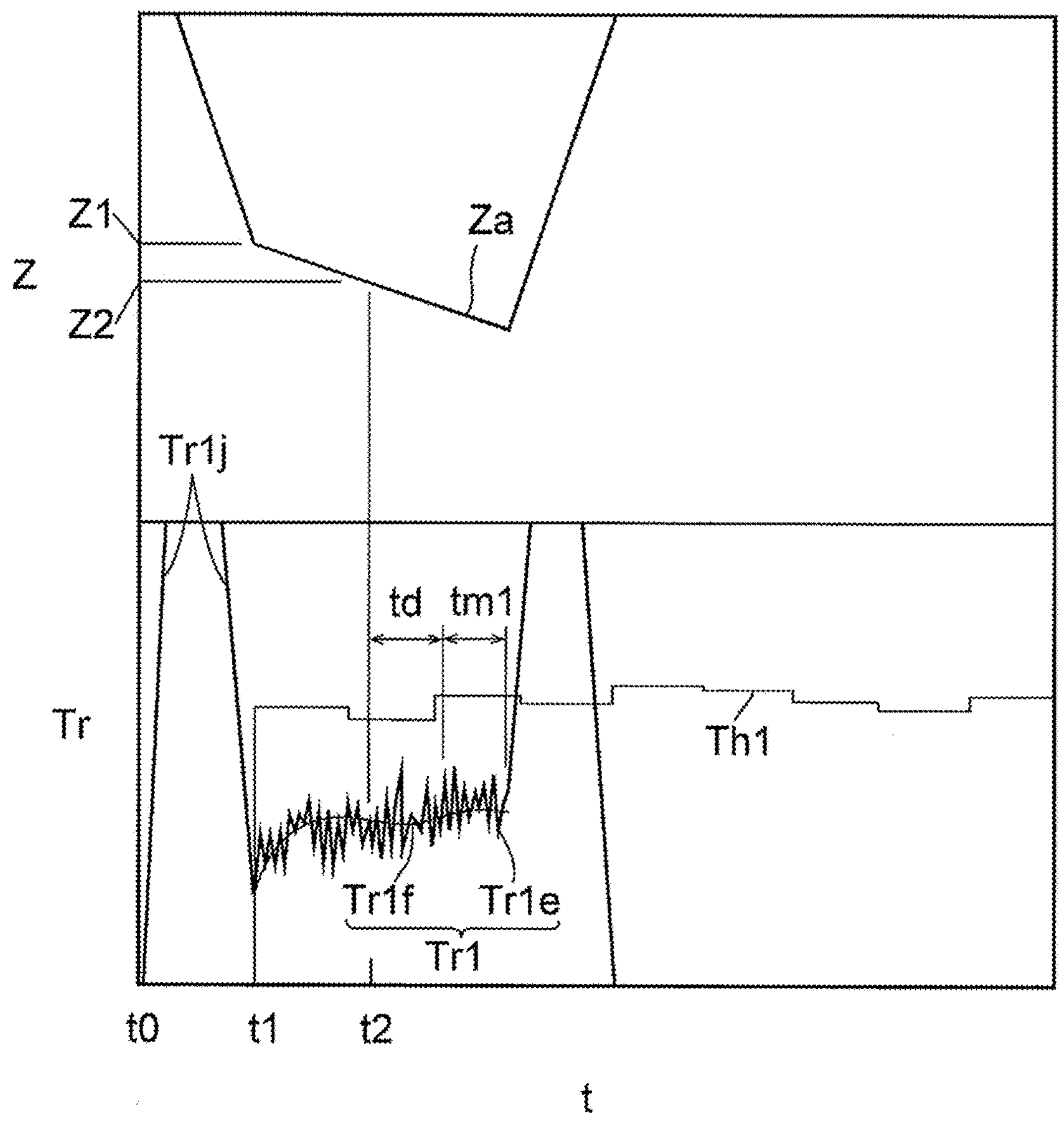
FIG. 6 shows a feed coordinate, a machining torque, and a threshold with respect to a machining time in case of tool breakage according to the present embodiment.
Figure 7:
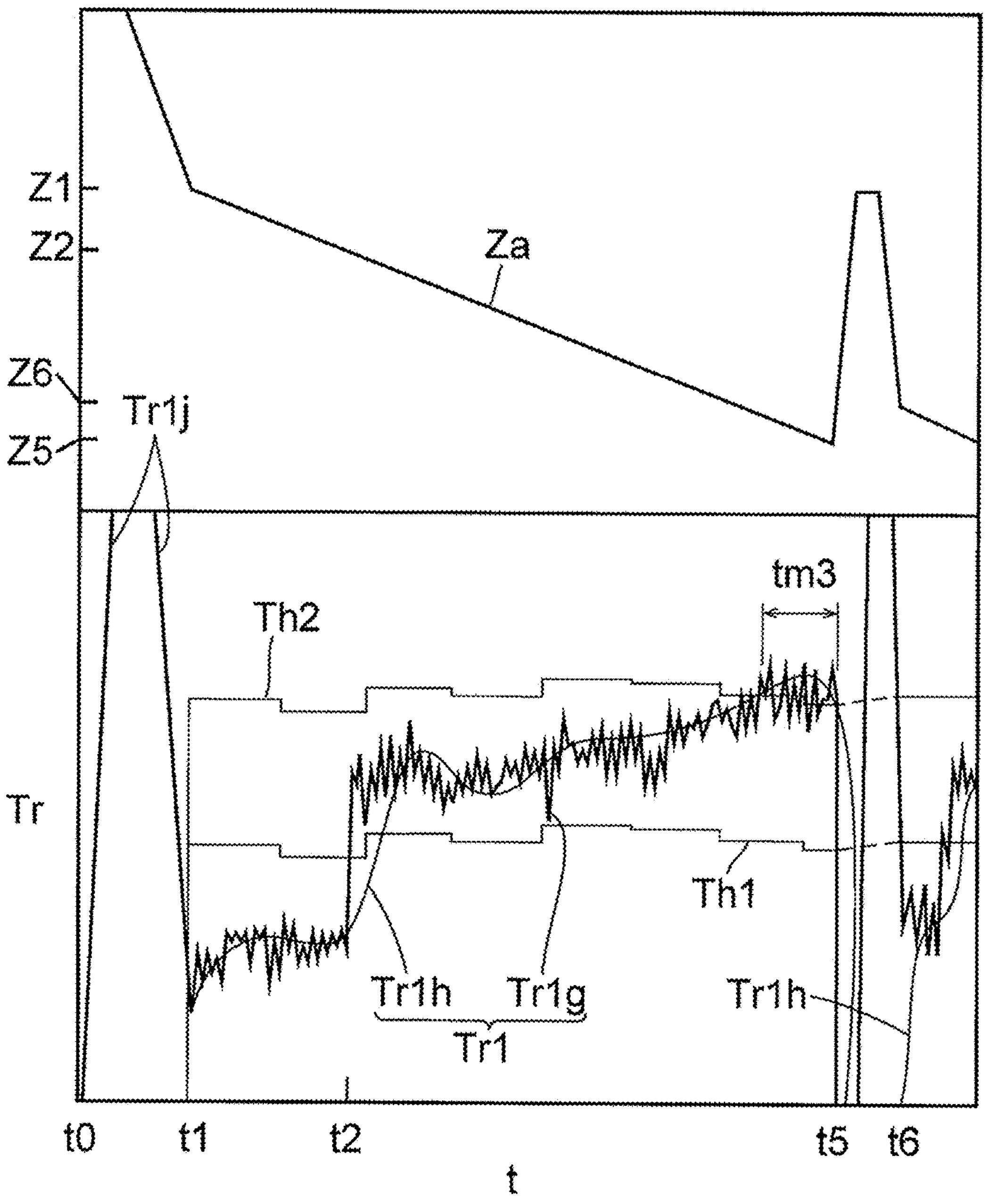
FIG. 7 shows a feed coordinate, a machining torque, and a threshold with respect to a machining time in case of step feed according to the present embodiment.

As shown in FIGS. 5 to 7, the machining torque Tr1 may include actual machining torques Tr1*c*, Tr1*e*, Tr1*g*, processed machining torques Tr1*d*, Tr1*f*, Tr1*h*, and a coordinate Za. The actual machining torques Tr1*c*, Tr1*e*, Tr1*g* each is an actual torque Tr with respect to time t. The processed machining torques Tr1*d*, Tr1*f*, Tr1*h* are obtained by filtering the actual machining torques Tr1*c*, Tr1*e*, Tr1*g*, respectively. The machining torque Tr1 may include a rapid feed torque Tr1*j*. The rapid feed torque Tr1*j* is a torque Tr when the feed table 15 is rapidly fed.

Note that the storage device 31 does not need to store the actual machining torques Tr1*a*, Tr1*c*, Tr1*e*, Tr1*g* or the rapid feed torque Tr1*j*. Further, the storage device 31 may temporarily store the machining torque Tr1.

As shown in the upper half of FIG. 2, the breakage threshold Th1 is the threshold of the torque Tr with respect to the coordinate Z. A machining feed length (Z3−Z1) is divided into a plurality of sections 55 at equal intervals. The breakage thresholds Th1 are set for each of the section 55. Here, the machining feed length is a distance at which the spindle 17 is fed, which is determined by the machining program 31*c*. The length of the section 55 may be very small. In an extreme case, the length of the section 55 may be the smallest unit of the feed coordinate Z.

The breakage threshold Th1 is set between the reference torque Tr0 and the machining torque Tr1 when the tool 1 is properly machining the workpiece 3. Here, the tool 1 properly machines the workpiece 3 when the tool 1 machines the workpiece 3 without breakage of the tool 1 or without clogging the drilling machine 10 by the chips generated during the machining.

The return threshold Th2 is a threshold of the torque Tr with respect to the coordinate Z. The return threshold Th2 is greater than the breakage threshold Th1. The return threshold Th2 is set between the machining torque Tr1 when the tool 1 is properly machining the workpiece 3 and the machining torque Tr1 when the tool 1 is broken. Otherwise, the return threshold Th2 is substantially the same as the breakage threshold Th1.

The breakage determination time tm0, the return determination time tm2, the breakage offset amount o1, and the return offset amount o2 are inputted from the outside in advance.

Note that one of the breakage threshold Th1 and the return threshold Th2, the breakage determination time tm0, and the return determination time tm2 may be omitted. Either the breakage offset amount o1 or the return offset amount o2 may be omitted.

The feed control unit 35 includes a filtering unit 35*a*, a torque measurement unit (thrust measurement device) 35*b*, and a feed unit 35*c*.

The filtering unit 35*a* performs filtering on the actual reference torque Tr0*a*, Tr0*c* to obtain the filtered reference torque Tr0*b*, Tr0*d*. The filtering unit 35*a* performs filtering on the actual machining torque Tr1*a*, Tr1*c*, Tr1*e*, Tr1*g* to obtain the filtered machining torque Tr1*b*, Tr1*d*, Tr1*f*, Tr1*h*. The filter is, for example, a low-pass filter.

Here, the actual reference torque Tr0*a*, Tr0*c* and the actual machining torque Tr1*a*, Tr1*c*, Tr1*e*, Tr1*g* vary depending on the intermittent contact between the cutting edge of the tool 1 and the workpiece 3, the formation and separation of the built-up edge, the generation of chips, the frictional resistance between the chips and the workpiece 3 or the tool 1, the feed resistance of the feed device 11 or the ram 16, and the deflection of the ram 16. The actual reference torque Tr0*a*, Tr0*c* and the actual machining torque Tr1*a*, Tr1*c*, Tr1*e*, Tr1*g* vibrate at higher frequencies. The filtered reference torque Tr0*b*, Tr0*d* and the filtered machining torque Tr1*b*, Tr1*d*, Tr1*f*, Tr1*h* have a smooth wave shape in which a high-frequency component is removed.

The filtering unit 35*a* stores the filtered reference torque Tr0*b*, Tr0*d* and the filtered machining torque Tr1*b*, Tr1*d*, Tr1*f*, Tr1*h* in the storage device 31.

The torque measurement unit 35*b* measures the coordinate Z and the torque Tr with respect to the time t, and stores them in the storage device 31.

The feed unit 35*c* provides power to and rotates the feed motor 12. The feed unit 35*c* feedback-controls the feed motor 12. The feed unit 35*c* controls the feed motor 12 and the spindle motor 18 in accordance with the machining program 31*c*.

The determination unit 37 compares the filtered machining torque Tr1*b*, Tr1*d*, Tr1*f*, Tr1*h* with the breakage threshold Th1 and the return threshold Th2. The determination unit 37 may include a timer 37*a*. The timer 37*a* measures a low torque time (low thrust time) tm1 in which the machining torque Tr1 equal to or lower than the breakage threshold Th1 continues. In addition, the timer 37*a* measures an excess torque time (excess thrust time) tm3 in which the machining torque Tr1 equal to or larger than the return threshold Th2 continues.

The threshold determination unit 39 determines the breakage threshold Th1 and the return threshold Th2 based on the filtered reference torque Tr0*b*, Tr0*d*, the breakage offset amount o1, and the return offset amount o2. Specifically, as shown in FIG. 2, the threshold determination unit 39 divides the machining feed width (Z3−Z1) into a plurality of sections 55 by a predetermined number of divisions or section width. Then, the threshold determination unit 39 adds the breakage offset value o1 to the representative value of the filtered reference torque Tr0*b* for each section 55 to obtain the breakage threshold Th1. The threshold determination unit 39 adds the return offset amount o2 to the representative values of the filtered reference torque Tr0*b* for each section 55 to obtain the return threshold Th2. Here, the representative value is, for example, an average value, a maximum value, a minimum value, or an initial value of the section 55.

The threshold determination unit 39 may determine the breakage threshold Th1 and the return threshold Th2 based on a function using an environmental temperature, a temperature of the machining apparatus, a cumulative operation time, and a material of the workpiece as an argument. In this case, the storage device 31 may store the environmental temperature, the temperature of the machining apparatus, the cumulative operation time, and the material of the workpiece. The threshold determination unit 39 may determine the breakage offset amount o1 and the return offset amount o2 based on the environmental temperature, the temperature of the machining apparatus, the cumulative operation time, and the material of the workpiece.

Figure 3:
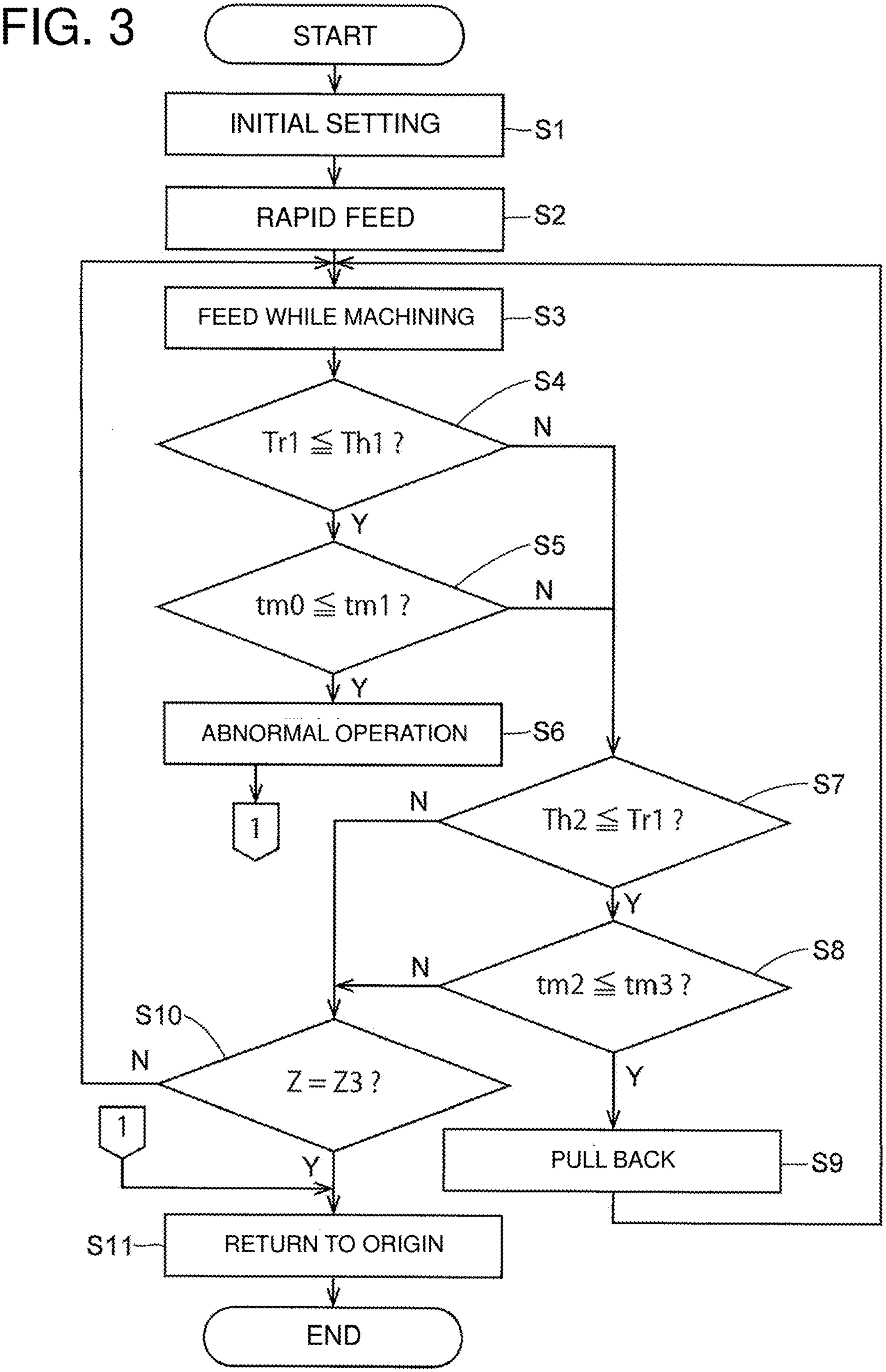
FIG. 3 is a flowchart showing a machining method according to the present embodiment.

The machining method of the present embodiment will be described with reference to FIGS. 1 and 3. In step S1, the drilling machine 10 is operated in accordance with the machining program 31*c* without the workpiece 3 being installed. The torque measurement unit 35*b* acquires the reference torque Tr0 with respect to the coordinate Z. The threshold determination unit 39 determines the breakage threshold Th1 and the return threshold Th2, and stores them in the storage device 31.

Next, the workpiece 3 is installed, and the drilling machine 10 is operated in accordance with the machining program 31*c*. Here, the spindle motor 18 rotates the spindle 17. In step S2, the spindle 17 is rapidly fed until the tool 1 reaches the machining feed start point 51. In step S3, the spindle 17 is fed while machining until the tool 1 reaches the machining end point 53. While the spindle 17 is being fed, the monitoring process of steps S4 to S10 is always repeatedly executed. During this time, the torque measurement unit 35*b* constantly acquires the machining torque Tr1 and the coordinate Z. During this time, the determination unit 37 constantly monitors the machining torque Tr1.

In step S4, when the machining torque Tr1 becomes equal to or smaller than the breakage threshold Th1, the process proceeds to the step S5. Otherwise, the process proceeds to the step S7. In step S5, the timer 37*a* measures the low torque time tm1 (see FIG. 6). When the low torque time tm1 becomes equal to or longer than the breakage determination time tm0, the process proceeds to the step S6. Otherwise, the process proceeds to the step S7. In step S6, the determination unit 37 transmits an alarm. Then, the process proceeds to the step S11.

In step S7, when the machining torque Tr1 becomes equal to or larger than the return threshold Th2, the process proceeds to the step S8. Otherwise, the process proceeds to the step S10. In step S8, when the excess torque time tm3 becomes equal to or longer than the return determination time tm2, the process proceeds to the step S9. Otherwise, the process proceeds to the step S10.

In step S9, the feed unit 35*c* once rapidly pulls back the spindle 17 to the machining feed start point 51. The feed unit 35*c* then rapidly feeds the spindle 17 to a slightly higher coordinate (Z=Z6, see FIG. 7) than a pullback position Z5 (see FIG. 7). Here, the pullback position Z5 is a position in which the spindle 17 is pulled back. Then, the process returns to the step S3.

In step S10, when the tool 1 reaches the machining end point 53, the process proceeds to the step S11. Otherwise, the process returns to the step S3. In step S11, the spindle 17 rapidly returns to the origin 50.

The step S1 may be performed periodically. For example, the step S1 may be performed every time the actual machining of the steps S2 to S11 is performed specified number of times (for example, 5000 times). Alternatively, the step S1 may be performed every specified period (for example, 30 minutes).

Note that the steps S7 to S9 may be omitted. The steps S4 to S6 may be omitted. When the breakage determination time tm0 is omitted, the step S5 is omitted. When the return determination time tm2 is omitted, the step S8 is omitted.

Referring to FIGS. 1 and 4, the step S1 will be described in detail. In step S1, the drilling machine 10 is driven under the same conditions as the actual machining except that the workpiece 3 is not installed. That is, the drilling machine 10 operates in accordance with the machining program 31*c*. The torque measurement unit 35*b* records the coordinate Z and the reference torque Tr0 with respect to the time t from the start of machining (t=t0) to the end of machining (t=t3). In FIG. 4, t0≤t≤t1 indicates a rapid feed until the tool 1 reaches the machining feed start point 51 from the origin 50. During this time, the rapid feed torque Tr0*j* exhibits a higher peak. In t1≤t≤t3, the spindle 17 is fed while machining from the machining feed start point 51 to the machining end point 53. The filtering unit 35*a* filters the actual reference torque Tr0*c* to obtain the filtered reference torque Tr0*d*. The filtering unit 35*a* stores the actual reference torque Tr0*c*, the filtered reference torque Tr0*d*, and the coordinate Za in the storage device 31.

The threshold determination unit 39 removes the rapid feed torque Tr0*j* when determining the breakage threshold Th1 and the return threshold Th2. In other words, in Z0≤Z≤Z1, the breakage threshold Th1 and the return threshold Th2 are not given.

The actual machining process will be described with reference to FIGS. 5 to 7. The actual machining corresponds to steps S2 to S11.

FIG. 5 shows the machining torque Tr1 and the coordinate Za when the machining proceeds properly. In t0≤t≤t1, the step S2 is performed. The spindle 17 is rapidly fed from the origin 50 (Z=Z0) to the machining feed start point 51 (Z=Z1).

The step S3 is then performed. Then, the spindle 17 is fed while machining with the machining end point 53 as an end point.

At t=t2, the tool 1 contacts the workpiece 3, and the actual machining torque Tr1*c* rapidly increases. The position at this time is referred to as a machining start point 52 (see FIG. 1). The coordinate Z of the machining start point 52 is Z2. The filtered machining torque Tr1*d* increases later than the actual machining torque Tr1*c*. The time from the machining start time (t=t2) until the filtered machining torque Tr1*d* increases is referred to as a delay time td. Here, the machining start time t2 is when the tool 1 reaches the machining start point 52. The delay time td is determined by a time constant determined by the filters. The increment of the feed coordinate corresponding to the delay time td is referred to as a delay coordinate (delay distance) Zd. The delay coordinate Zd is determined by the delay time td, the feed rate (not shown), and the acceleration (not shown).

The determination unit 37 does not perform the step S4 while the tool 1 moves from the machining starting point (Z=Z2) to the delay coordinate Zd. Note that the determination unit 37 may stop performing the step S4 from the machining start time t2 to elapse the delay time td.

The machining start time t2 is determined by the coordinate Z1, the coordinate Z2 of the machining start point 52, the feed rate (not shown), and the accelerations (not shown).

The determination unit 37 performs the steps S4 to S10 from the time when the filtered machining torque Tr1*d* increases (t=t2+td). As shown in FIG. 5, when the filtered machining torque Tr1*d* during machining is equal to or larger than the breakage threshold Th1 (N in step S4) and is equal to or smaller than the return threshold Th2 (N in step S7), the steps S3, S4, S7, and S10 are repeatedly performed. When the spindle 17 reaches the machining end point 53 (Y in step S10), the step S11 is performed. The machining is then completed.

FIG. 6 shows the machining torque Tr1 and the coordinate Za with respect to time t when the tool 1 is broken from the beginning of machining. As the tool 1 is broken, the tool 1 does not contact the workpiece 3 even if the spindle 17 reaches the original machining starting point 52 at the time t2. The actual machining torque Tr1*e* and the filtered machining torque Tr1*f* are thus substantially the same as the reference torque Tr0. Then, the filtered machining torque Tr1*f* does not increase to the breakage threshold Th1 even after the elapse of the delay time td from the machining start (t=t2) (Y in step S4). Here, the timer 37*a* starts measuring the low torque time tm1. When the low torque time tm1 becomes equal to or longer than the breakage determination time tm0 (Y in step S5), the determination unit 37 determines that the tool 1 is broken (step S6).

It should be noted that the machining torque Tr1 may increase in a relatively short time even when the machining torque Tr1 lately reaches the breakage threshold Th1 (Y in step S4). In step S5, when the low torque time tm1 is less than the breakage determination time tm0 (N in step S5), the process proceeds to step S7, and the machining is continued.

FIG. 7 shows the machining torque Tr1 and the coordinate Za with respect to the time t when the tool 1 is not broken (N in step S4) and the step feeding is performed (Y in step S7). The steps S2 to S3 are performed as described above. As the machining progresses, the actual machining torque Tr1*g* and the filtered machining torque Tr1*h* gradually increase. The machining feed is continued while the filtered machining torque Tr1*h* is less than the return threshold Th2 (N in step S4, and N in step S7).

When the filtered machining torque Tr1*h* exceeds the return threshold Th2 (Y in step S7), the timer 37*a* measures the excess torque time tm3. When the excess torque time tm3 becomes equal to or longer than the return determination time tm2 (Y in Step S8), the step S9 is performed. At this time, at time t=t5, the coordinate Z is the pullback position (Z=Z5). The feed unit 35*c* rapidly feed the spindle 17 to the machining feed start point 51 (Z=Z1). Here, chips are discharged. The feed unit 35*c* then rapidly feed the spindle 17 to Z=Z6. At this time, as Z6 is slightly larger than Z5, the tool 1 does not contact the workpiece 3. The feed unit 35*c* then feeds the spindle 17 while machining toward the machining end point 53 (step S3). When the spindle 17 properly reaches the machining end point 53 (Z=Z3), the step S11 is performed.

Even if the machining torque Tr1 once exceeds the return threshold Th2, it may be lower than the return threshold Th2 in a very short time. In step S8, if the excess torque time tm3 does not exceed the return determination time tm2 (N in step S8), the process proceeds to step S10. In this case, the machining feed is continued without performing the step feed in step S9.

When the drilling machine 10 of the present embodiment performs a drilling machining using a small-diameter drill or a small-diameter tap, the cutting resistance is very small. The difference between the machining torque Tr1 of the feed motor 12 at the time of machining and the reference torque Tr0 of the feed motor 12 at the time of non-machining is very small. Further, the reference torque Tr0 varies depending on a change in the machining point, a deflection of the ram 16, and a feed resistance of the feed table 15. The ram 16 is deflected by gravity acting on the ram 16 and the spindle 17. The deflection of the ram 16 may increase with aging. When the ram 16 deflects, the sliding resistance between the ram 16 and the ram guide 19 increases. Further, the reference torque Tr0 and the machining torque Tr1 vary depending on the machining conditions and the feed amount of the ram 16.

When the reference torque Tr0 and the machining torque Tr1 have large variation amount and large change amount with time with respect to the cutting resistance, it is difficult to control the timings of the tool breakage and the step feed by comparing the machining torque Tr1 with the thresholds.

According to the machining method of the present embodiment, the control device 30 acquires the reference torque Tr0 according to the machining condition and the coordinate Z, and determines the breakage threshold Th1 and the return threshold Th2. Then, the breakage threshold Th1 and the return threshold Th2 include machining conditions, changes with time, sliding resistance with respect to the feed amount of the ram 16, and variation of the resistance of the feed screw 13 with respect to the position. Thus, according to the machining methods of the present embodiment, even when the cutting resistance is very small and the variation of the machining torque Tr1 or the reference torque Tr0 is large, it is possible to appropriately detect the breakage of the tool 1 and the change of the machining point.

The present invention is not limited to the above-described embodiments, and various modifications can be made without departing from the gist of the present invention, and all technical matters included in the technical idea described in the claims are the subject of the present invention. While the above embodiments have been shown by way of example, those skilled in the art will recognize that various alternatives, modifications, variations, and improvements can be made from the disclosure herein, which fall within the scope of the appended claims.

REFERENCE SIGNS LIST

- 3 Workpiece
- 17 Spindle
- 51, Z1 Machining feed start point
- 53, Z3 Machining end point
- Th1 Breakage threshold
- Th2 Return thresholds
- Tr0 Reference torque (Reference thrust)
- Tr1 Machining torque (Machining thrust)
- Z Feed coordinate

What is claimed is:

1. A machining method, comprising:

measuring a reference thrust of a spindle when the spindle is fed from a machining feed start point to a machining end point in a direction in which the spindle extends under a machining condition without machining a workpiece;

determining a return threshold with respect to a feed coordinate based on the reference thrust;

measuring a machining thrust of the spindle with respect to the feed coordinate while machining the workpiece, the return threshold is set between the machining thrust when a tool is properly machining the workpiece and the machining thrust when the tool is broken;

comparing the machining thrust with the return threshold with respect to the feed-coordinate;

pulling back the spindle to the machining feed start point when the machining thrust with respect to the feed coordinate is equal to or larger than the return threshold; and feeding the spindle again for machining.

2. The machining method according to claim 1, wherein the measuring the machining thrust includes measuring the machining thrust of the spindle with respect to the feed coordinate while drilling or tapping the workpiece.

3. The machining method according to claim 2, further comprising:

determining the return threshold for each of a plurality of sections that are divided from the machining feed start point to the machining end point.

4. The machining method according to claim 2, further comprising:

filtering the reference thrust;

storing, in advance, a machining start point at which a tool attached to a distal end of the spindle contacts to the workpiece; and comparing the machining thrust with the return threshold after the spindle advances a delay distance from the machining start point, the delay distance corresponding to a delay time due to the filtering.

5. The machining method according to claim 2, further comprising:

filtering the reference thrust;

storing, in advance, a machining start time at which a tool attached to a distal end of the spindle contacts to the workpiece; and comparing the machining thrust with the return threshold after elapsing a delay time due to the filtering from the machining start time.

6. The machining method according to claim 1, further comprising:

determining the return threshold for each of a plurality of sections that are divided from the machining feed start point to the machining end point.

7. The machining method according to claim 6, further comprising:

filtering the reference thrust;

storing, in advance, a machining start point at which a tool attached to a distal end of the spindle contacts to the workpiece; and comparing the machining thrust with the return threshold after the spindle advances a delay distance from the machining start point, the delay distance corresponding to a delay time due to the filtering.

8. The machining method according to claim 1, further comprising:

filtering the reference thrust;

storing, in advance, a machining start point at which a tool attached to a distal end of the spindle contacts to the workpiece; and comparing the machining thrust with the return threshold after the spindle advances a delay distance from the machining start point, the delay distance corresponding to a delay time due to the filtering.

9. The machining method according to claim 1, further comprising:

filtering the reference thrust;

storing, in advance, a machining start time at which a tool attached to a distal end of the spindle contacts to the workpiece; and comparing the machining thrust with the return threshold after elapsing a delay time due to the filtering from the machining start time.

10. The machining method according to claim 1, wherein the return threshold is determined by adding a return offset amount to the reference thrust.

11. The machining method according to claim 1, wherein the reference thrust is a reference torque of a feed screw in the spindle without machining the workpiece, and the machining thrust is a machining torque of the feed screw.

12. The machining method according to claim 1, further comprising:

determining a breakage threshold with respect to the feed coordinate based on the reference thrust; and determining that the tool has been broken at a start of machining when a low thrust time is equal to or longer than a predetermined breakage determination time, the low thrust time being a time at which the machining thrust with respect to the feed coordinate is equal to or less than the breakage threshold.

13. The machining method according to claim 1, further comprising:

returning the spindle to the machining feed start point when an excess thrust time is equal to or longer than a predetermined return determination time, the excess thrust time being a time at which the machining thrust with respect to the feed coordinate is equal to or larger than the return threshold.

14. A machining apparatus, comprising:

a feed device configured to feed a spindle;

a thrust measurement device configured to measure a thrust of the spindle;

a storage device configured to store a reference thrust of the spindle measured when the spindle is fed from a machining feed start point to a machining end point in a direction in which the spindle extends under a machining condition without machining a workpiece, and a return threshold with respect to a feed coordinate;

a threshold determination unit configured to determine the return threshold based on the reference thrust; and a determination unit configured to compare a machining thrust of the spindle with respect to the feed coordinate with the return threshold, the machining thrust being measured while machining the workpiece, the return threshold being set between the machining thrust when a tool is properly machining the workpiece and the machining thrust when the tool is broken, the determination unit determining whether the machining thrust is equal to or larger than the return threshold; and a feed control unit configured to pull back the spindle to the machining feed start point when the machining thrust is equal to or larger than the return threshold and configured to feed the spindle again while machining.

15. The machining apparatus according to claim 14, wherein the threshold determination unit determines, based on the reference thrust, the return threshold for each of a plurality of sections that are divided from the machining feed start point to the machining end point.

16. The machining apparatus according to claim 14, wherein the storage device is configured to store a breakage threshold, the threshold determination unit is configured to determine the breakage threshold based on the reference thrust, and the determination unit is configured to compare a machining thrust of the spindle with respect to the feed coordinate with the breakage threshold, the machining thrust being measured while machining the workpiece, and the determination unit determines whether the machining thrust with respect to the feed coordinate is equal to or less than the breakage threshold.

17. The machining apparatus according to claim 16, wherein the storage device stores a breakage determination time, and the determination unit includes a timer configured to measure a low thrust time that is a time at which the machining thrust is equal to or less than the breakage threshold, and determines that a tool has been broken at a start of machining when the low thrust time is equal to or longer than the breakage determination time.

18. The machining apparatus according to claim 14, wherein the storage device stores a return determination time, and the determination unit includes a timer configured to measure an excess thrust time that is a time at which the machining thrust is equal to or larger than the return threshold, and returns the spindle to the machining feed start point when the excess thrust time is equal to or longer than the return determination time.

* * * * *